United States Patent [19]
Yamada et al.

[11] Patent Number: 6,014,188
[45] Date of Patent: *Jan. 11, 2000

[54] PLASMA ADDRESS LCD WITH WALL-LIKE SPACERS AND METHOD FOR MANUFACTURING THE SAME

[75] Inventors: Nobuaki Yamada, Higashiosaka; Shuichi Kozaki, Nara; Kenji Majima, Matsubara, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/725,316

[22] Filed: Oct. 2, 1996

[30] Foreign Application Priority Data

Nov. 13, 1995 [JP] Japan ................................. 7-294605
Jul. 18, 1996 [JP] Japan ................................. 8-189755

[51] Int. Cl.⁷ .................... G02F 1/1339; G02F 1/133; G09G 3/14
[52] U.S. Cl. .................... 349/32; 349/156; 345/37
[58] Field of Search ................ 349/32, 155, 156; 345/37, 60; 313/582

[56] References Cited

U.S. PATENT DOCUMENTS

| | | | |
|---|---|---|---|
| 4,896,149 | 1/1990 | Buzak et al. | 345/60 |
| 5,077,553 | 12/1991 | Buzak | 345/60 |
| 5,268,782 | 12/1993 | Wenz et al. | 346/156 |
| 5,473,450 | 12/1995 | Yamada et al. | 349/84 |
| 5,499,122 | 3/1996 | Yano | 349/32 |
| 5,519,520 | 5/1996 | Stoller | 349/32 |

FOREIGN PATENT DOCUMENTS

| | | | |
|---|---|---|---|
| 57-186735 | 11/1982 | Japan . | |
| 61-502128 | 9/1986 | Japan . | |
| 1-217396 | 8/1989 | Japan . | |
| 4-212928 | 8/1992 | Japan . | |
| 4-265931 | 9/1992 | Japan . | |
| 4-313788 | 11/1992 | Japan . | |
| 4-338923 | 11/1992 | Japan . | |
| 5-27242 | 2/1993 | Japan . | |
| 5-264982 | 10/1993 | Japan . | |
| 6-194655 | 7/1994 | Japan . | |
| 6-265863 | 9/1994 | Japan . | |
| 6-301015 | 10/1994 | Japan . | |
| 6-308496 | 11/1994 | Japan . | |
| 7-28039 | 1/1995 | Japan . | |
| 7-072464 | 3/1995 | Japan . | 349/137 |
| 7-120728 | 5/1995 | Japan . | |
| WO 85/04262 | 9/1985 | WIPO . | |

Primary Examiner—William L. Sikes
Assistant Examiner—Toan Ton
Attorney, Agent, or Firm—Nixon & Vanderhye, P.C.

[57] ABSTRACT

The liquid crystal display device of this invention includes a display medium sandwiched between a plasma generation substrate having channels for generating plasma and a counter substrate. In this liquid crystal display device, the display medium includes liquid crystal regions and polymer regions, wherein the liquid crystal molecules in the liquid crystal regions are axisymmetrically aligned.

11 Claims, 15 Drawing Sheets

The screen of the liquid crystal display device

The polarizing axis of the polarizing plate

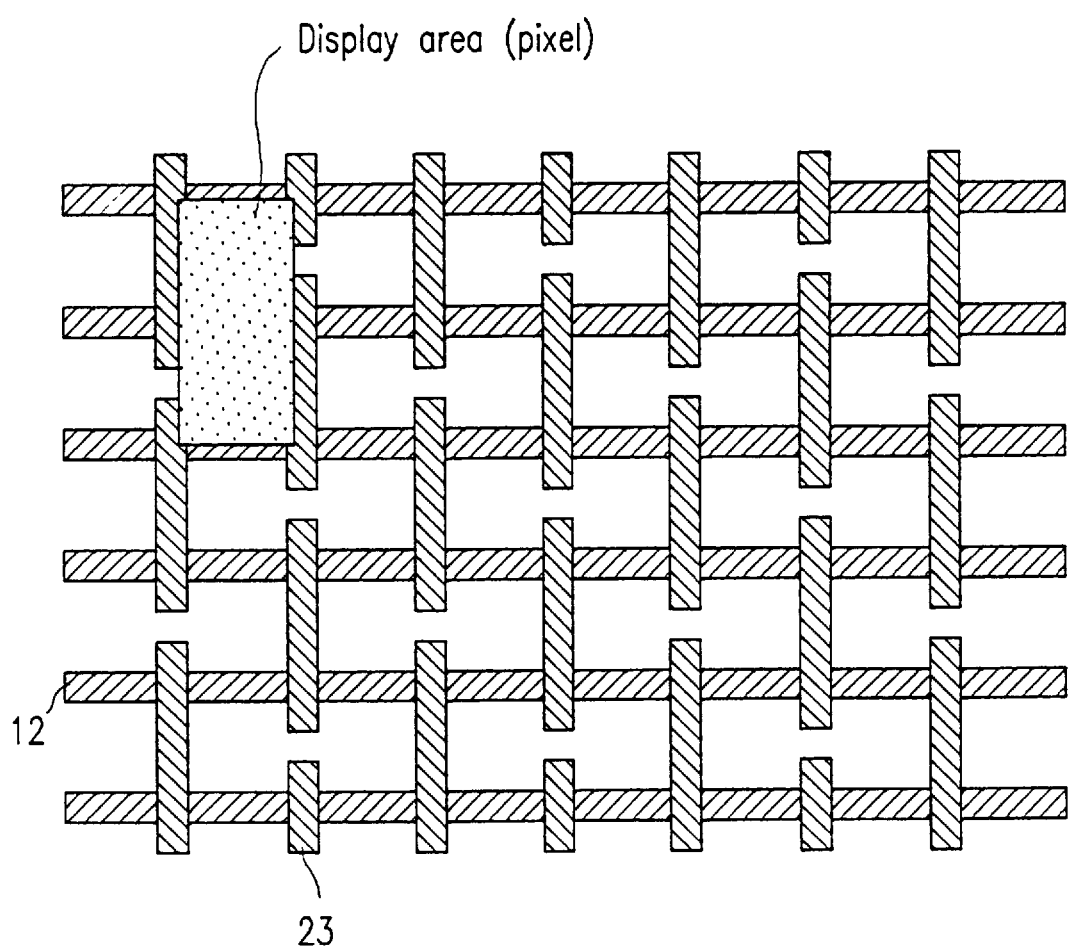

Back light

PLASMA ADDRESS LCD WITH WALL-LIKE SPACERS AND METHOD FOR MANUFACTURING THE SAME

BACKGROUND OF THE INVENTION

1. Field of the Description

The present invention relates to a liquid crystal display device and a method for manufacturing the same. More particularly, the present invention relates to a liquid crystal display device including a display medium sandwiched between a plasma generation substrate having channels for generating plasma and a counter substrate, and a method for manufacturing the same.

2. Description of the Related Art

There is a demand for increasing a viewing angle of a liquid crystal display device because the viewing angle of a conventional liquid crystal display device is rather narrow. As a method of increasing the viewing angle of a twisted nematic liquid crystal display device (TN-LCD), the following techniques are conventionally adopted: (i) A technique of attaining a wide viewing angle by improving the alignment state of liquid crystal in a liquid crystal cell (namely, a technique for making improvement from inside the liquid crystal cell); and (ii) a technique of attaining a wide viewing angle by spreading beams on the side of a viewer by utilizing the characteristic of the front face of a liquid crystal cell (namely, a technique for making improvement from outside the liquid crystal cell).

In adopting the technique of attaining a wide viewing angle by improving the alignment state of the liquid crystal in a liquid crystal cell, the viewing angle characteristic can be improved by aligning liquid crystal molecules in at least two directions within a pixel. This technique will now be described referring to FIGS. 12A through 12F.

FIGS. 12D through 12F are schematic sectional views for showing the alignment state of the liquid crystal molecules in a conventional TN-LCD, wherein FIG. 12D shows the alignment state under application of no voltage, FIG. 12E shows the alignment state in a gray level display under application of a voltage, and FIG. 12F shows the alignment state under application of a saturation voltage. This liquid crystal display device has a pretilt angle in its initial alignment under application of no voltage as shown in FIG. 12D. When a voltage is applied, the liquid crystal molecules all rise in the same direction as shown in FIG. 12E. Accordingly, when the liquid crystal display device is viewed at different angles A and B, the display contrast varies greatly because the apparent refractive index is different between these angles. In addition, in the gray level display as is shown in FIG. 12E, the display quality is largely degraded; for example, a displayed image can be inverted depending upon the viewing angle. FIGS. 12A through 12C are schematic sectional views for showing the alignment state of liquid crystal molecules in a liquid crystal display device in which the liquid crystal molecules are aligned in at least two directions; wherein FIG. 12A shows the alignment state under application of no voltage, FIG. 12B shows the alignment state in gray level display under application of a voltage, and FIG. 12C shows the alignment state under application of a saturation voltage. When this liquid crystal display device is viewed at the angles A and B, the apparent refractive index is averaged so that the light transmittance can be the same at both angles, and hence, the viewing angle characteristic can be improved in the gray level display as well.

As specific examples of a liquid crystal display device with a wide viewing angle, the following six types are known:

A first type liquid crystal display device includes a polymer wall in a liquid crystal cell, and requires neither a polarizing plate nor an alignment treatment. In this liquid crystal display device, the transparent and opaque states are electrically controlled by using the birefringence of liquid crystal. In this type, the refractive index against ordinary light of the liquid crystal molecules accords with the refractive index of a support medium. Therefore, the transparent state is basically displayed when a voltage is applied to align the liquid crystal, and the opaque state (that is, the light scattering state due to the turbulence of the alignment of the liquid crystal molecules), is displayed when a voltage is not applied. Various techniques have been proposed regarding this type of liquid crystal display device. For example, Japanese laid-open National Patent Publication 61-502128 discloses a technique of forming liquid crystal droplets in a photopolymerizable resin or a thermosetting resin by polymerizing the resin in a mixture of the resin and liquid crystal and depositing the liquid crystal. Furthermore, Japanese Laid-Open Patent Publication Nos. 4-338923 and 4-212928 describe a technique of attaining a wide viewing angle by providing two orthogonal polarizing plates on both outer surfaces of a liquid crystal cell.

In a second type liquid crystal display device, in order to improve the viewing angle characteristic of a liquid crystal cell of a non-scattering type using a polarizing plate, phase separation is caused in a mixture of liquid crystal and a photopolymerizable resin, thereby forming a composite material of the liquid crystal and the polymeric material (Japanese Laid-Open Patent Publication No. 5-27242). In this type liquid crystal display device, the composite material makes the alignment of liquid crystal domains random, and hence, the liquid crystal molecules rise in different directions in the respective domains when a voltage is applied. As a result, the apparent transmittance becomes the same at various viewing angles, namely, the value of d·Δn (where-in d indicates the thickness of a liquid crystal layer and Δn indicates the refractive index anisotropy of the liquid crystal) is averaged, and hence, the viewing angle characteristic in the gray level display can be improved.

A third type liquid crystal display device has recently been proposed by the present inventors, in which liquid crystal molecules are omnidirectionally (for example, spirally) aligned in a pixel region. This liquid crystal display device is manufactured by light irradiation of a liquid crystal cell including a liquid crystal material and a photopolymerizable resin two-dimensionally controlling a light intensity distribution within a screen (for example, by using a photomask). The liquid crystal molecules are controlled in accordance with a voltage to be applied, so that the spiral alignment becomes similar to the homeotropic alignment, and hence, the viewing angle characteristic can be remarkably improved (Japanese Laid-Open Patent Publication Nos. 6-301015 and 7-120728).

In a fourth type liquid crystal display device, a film of a crystalline polymeric material having a spherulite structure is formed on a substrate. A wide viewing angle display mode can be attained by utilizing an axisymmetrical alignment regulation force caused by the spherulite structure (Japanese Laid-Open Patent Publication No. 6-308496).

In a fifth type liquid crystal display device, an alignment film is coated on a substrate, and liquid crystal molecules are aligned in random directions without conducting an alignment treatment such as a rubbing treatment (Japanese Laid-Open Patent Publication No. 6-194655).

In a sixth type liquid crystal display device, a pixel region is divided into a plurality of areas, and liquid crystal molecules are aligned in each area so as to compensate the viewing angle characteristic (Japanese Laid-Open Patent Publication No. 57-186735).

Meanwhile, as a liquid crystal display device (LCD) for a plane display, a TFT-LCD including a thin film transistor (TFT) as a switching element for turning on/off pixels is widely used at present.

The TFT-LCD is, however, regarded as not practical for use as a display apparatus with a large screen of 20 inches or more, for example, a wall-mounted television, which is expected to be realized in the future. In the field of the display apparatus with a large screen, a plasma address LCD (PALC) is proposed as one of replacements of the TFT-LCD (Japanese Laid-Open Patent Publication No. 1-217396).

The plasma address LCD comprises, as is shown in FIG. 13, a transparent substrate 101 and a plasma generation substrate 111 for sandwiching a liquid crystal layer 102. The plasma generation substrate 111 includes walls 112, a thin glass plate 116, line-like channels 113 defined by the walls 112 and the thin glass plate 116 for sealing an ionization gas therein, and anode electrodes 114 and cathode electrodes 115 disposed in the channels 113 for ionizing the ionization gas.

On the surface of the substrate 101 facing the liquid crystal layer 102, transparent electrodes 105 serving as data lines are formed in the shape of stripes extending, when seen in the normal direction of the substrate, in the perpendicular direction to the channels 113.

This plasma address LCD is driven by successively scanning the channels 113 and supplying image data to the corresponding transparent electrodes 105 synchronously with the scanning of the channels 113.

For example, as is shown in FIG. 14A, the channels 113 are successively scanned, so that a selected channel 113 is ionized to be turned on. Under this condition, the voltage variation of data 1, 2 or 3 supplied via the transparent electrodes 105 is held by storing charges in the rear surface (i.e., the surface not facing the liquid crystal layer) of the thin glass plate 116. On a channel 113 that has been ionized (i.e., in an on-state), a signal from the corresponding transparent electrode 105 is applied to the liquid crystal layer 102, so that the transmittance of the liquid crystal layer 102 is changed. On a channel 113 that has not been ionized (i.e., in an off-state), the transmittance of the liquid crystal layer 102 is not changed. In this manner, a switching operation for turning on/off the liquid crystal cell is conducted by ionizing or nonionizing each channel 113 as is shown in FIG. 14B. Thus, an image can be displayed.

In order to manufacture a display apparatus with a large screen adopting the aforementioned display technique at a low cost, it is necessary to manufacture the channels 113 by an economical method. As a method for manufacturing the channels at a low cost, a technique of forming walls or the like by printing glass paste on a glass substrate is proposed (Japanese Laid-Open Patent Publication No. 4-265931).

However, the above-described plasma address LCD (PALC) has the following problems:

First, the liquid crystal display mode used in the PALC is mainly the TN mode. When a display device with a large screen is manufactured by using the TN mode, the viewing angle can be different, for example, like angles a and b shown in FIG. 15, depending upon the position of a viewer. In other words, there are a number of positions of a viewer having largely different viewing angles on the screen. Therefore, an image can be differently seen from the positions having the different viewing angles when the TN mode is adopted. Furthermore, in using such a large screen, the thickness of the liquid crystal cell is varied due to the weight of the liquid crystal in the liquid crystal layer when the cell is manufactured by the conventional method in which beads are disposed in the liquid crystal layer for retaining the thickness at a predetermined size. In particular, when a plastic substrate is used or a polarizing plate is used also as a substrate for the purpose of decreasing the weight and the thickness of the display device, the cell thickness can be largely varied.

Second, in a liquid crystal cell of the TN mode, a polarizing plate is occasionally disposed with its polarizing axis inclined at an angle of 45° against the latitudinal or longitudinal direction of the screen because of its viewing angle characteristic. In this case, there arises a problem that a point for adhesion can be seen so as to cause light leakage because of birefringence at a point having a different refractive index (for example, an adhesion point between a plasma generation substrate and a thin dielectric film) or because of a difference in the reflectance of polarized light at the adhesion point.

Thirdly, when a dielectric film (for example, a glass plate) disposed between a plasma generation substrate and a liquid crystal layer is made thick in order to improve the strength of such a display device, it is difficult to control the position of charges on the side of the film facing the liquid crystal layer, and hence, a resultant displayed image is unclear with a blurred outline. In order to solve this problem, a technique of forming transparent electrodes on the surface of the glass plate facing the liquid crystal layer in a pattern in accordance with the direction of the channels is proposed (Japanese Laid-Open Patent Publication No. 4-313788). This technique has, however, the following problems. Since this technique includes the step of forming an ITO film on a thin glass film and patterning it, the manufacturing PROCESS would be complicated. Furthermore, the need of alignment with a black mask complicates a fabrication apparatus for a liquid crystal display device. In contrast, when the dielectric film is made thin, the strength of the display apparatus is insufficient, and the cell thickness in the liquid crystal layer is varied so as to cause nonuniformity in a displayed image. In an operation mode with an alignment film, particularly in the case of a liquid crystal panel with a large-sized screen, a voltage applied across a liquid crystal layer (a voltage distribution) varies from part to part due to nonuniformity of the thickness of the alignment film, resulting in a nonuniform displayed image.

Fourthly, a rubbing treatment is required in the TN and STN modes where liquid crystal molecules are aligned in one direction on the substrate, and the rubbing treatment can damage the complicated structure of a plasma generation substrate. Furthermore, when beads are used for retaining the cell thickness, a stress is collected on portions in contact with the beads during the fabrication of the cell and the injection of the material for a display medium by vacuum injection. This stress can occasionally damage the glass plate disposed between the channels and the display medium.

Accordingly, it is desired to realize a liquid crystal display device applicable to a large screen, having a fixed cell thickness, a high strength (for example, whose member disposed between plasma generation channels and a display medium can be prevented from being damaged) and a wide viewing angle characteristic, as well as a simple method for manufacturing such a liquid crystal display device.

SUMMARY OF THE INVENTION

The liquid crystal display device of this invention comprises a display medium sandwiched between a plasma generation substrate having channels for generating plasma and a counter substrate. In this liquid crystal display device, the display medium includes liquid crystal regions and polymer regions, and liquid crystal molecules in the liquid crystal regions are axisymmetrically aligned.

In one embodiment, the liquid crystal regions are formed correspondingly to respective pixels.

In another embodiment, the channels have a dielectric film for separating the channels from the display medium, and an inorganic film is formed on a surface of the dielectric film facing the channels.

In still another embodiment, transparent electrodes are disposed on a surface of the dielectric film facing the display medium correspondingly to respective pixels.

In still another embodiment, the channels have a polymeric film for separating the channels from the display medium.

Alternatively, the channels have a polarizing plate for separating the channels from the display medium.

In one embodiment, transparent electrodes are disposed on a surface of the polarizing plate facing the display medium correspondingly to respective pixels.

In still another embodiment, the polymer regions include a light absorbing agent.

In still another embodiment, the liquid crystal display device further comprises a pair of polarizing plates disposed with polarizing axes thereof respectively according to a longitudinal direction and a latitudinal direction of a screen of the liquid crystal display device.

In still another embodiment, a wall-like spacer is formed between the plasma generation substrate and the counter substrate so as to cross at least one of walls for partitioning the channels.

In still another embodiment, the liquid crystal display device further comprises a member made from a polymeric material having a lower softening point than a material for the wall-like spacer between the wall-like spacer and the plasma generation substrate.

In still another embodiment, the polymeric material is an adhesive agent.

The invention further provides the method for manufacturing a liquid crystal display device including a display medium sandwiched between a plasma generation substrate having channels for generating plasma and a counter substrate. In this liquid crystal display device, the display medium includes liquid crystal regions and polymer regions, liquid crystal molecules in the liquid crystal regions are axisymmetrically aligned, and a wall-like spacer is formed so as to cross at least one of walls for partitioning the channels. The method comprises the steps of forming the wall-like spacer on the counter substrate; and adhering the counter substrate bearing the wall-like spacer to the plasma generation substrate.

In one embodiment, the step of adhering the counter substrate to the plasma generation substrate includes steps of previously disposing a polymeric material having a lower softening point than a material for the wall-like spacer between the wall-like spacer and the plasma generation substrate; adhering the counter substrate to the plasma generation substrate; and applying a pressure to the adhered substrates at a temperature exceeding the softening point of the polymeric material.

Thus, the invention described herein makes possible the advantages of (1) providing a liquid crystal display device applicable to a large screen in which a cell thickness can be retained at a fixed value; (2) providing a liquid crystal display device applicable to a large screen having a high strength (for example, whose member disposed between plasma generation channels and a display medium can be prevented from being damaged); (3) providing a liquid crystal display device applicable to a large screen having a wide viewing angle characteristic; and (4) providing a simple method for manufacturing such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIG. 7 is a schematic plan view for showing the intersections between wall-like spacers and walls formed on a plasma generation substrate in the liquid crystal display device of FIG. 6A or 6B;

DESCRIPTION OF PREFERRED EMBODIMENTS

Figure 1:
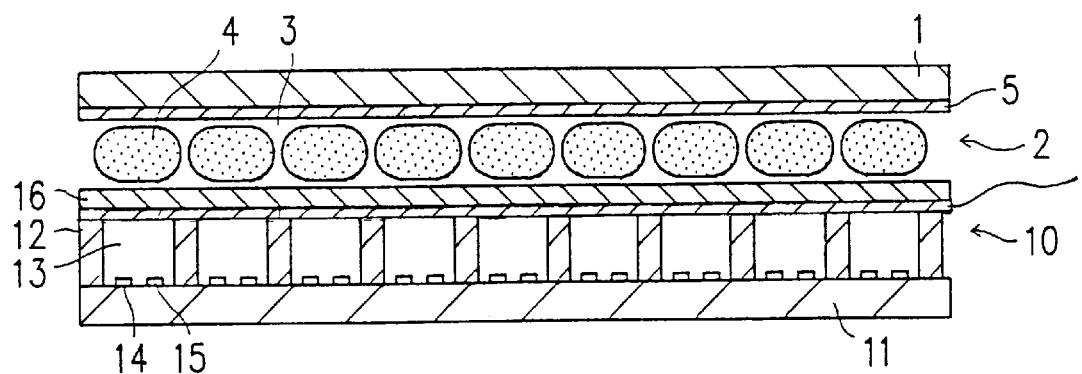
FIG. 1 is a schematic sectional view for showing an example of a liquid crystal display device according to the invention.

FIG. 1 is a schematic sectional view for showing an example of a liquid crystal display device of the invention. This liquid crystal display device is a plasma address liquid crystal display device (PALC), and comprises a display medium 2 sandwiched between a plasma generation substrate 10 and a counter substrate 1. The plasma generation substrate 10 includes a transparent substrate 11, a plurality of walls 12 formed on the substrate 11, a dielectric film 16, line-like channels 13 defined by the walls 12 and the dielectric film 16 for sealing an ionization gas therein, and anode electrodes 14 and cathode electrodes 15 disposed in the channels 13 for ionizing the ionization gas. The dielectric film 16 is provided with a conductive member (not shown) disposed therethrough.

Transparent electrodes can be formed on the surface of the dielectric film 16 facing the display medium 2 correspondingly to respective pixels, if necessary. When the transparent electrodes are formed to correspond to the respective pixels, a voltage can be applied to the display medium in each pixel (i.e., each liquid crystal region), and hence, charges can be prevented from spreading in aligning liquid crystal molecules. Since charges do not spread in generating charges by using plasma, the direction of an electric field to be formed scarcely deviates from the vertical direction of the liquid crystal display device. As a result, the liquid crystal molecules are excellently aligned in all the pixels. In addition, since the spread of the charges is thus prevented, a resultant displayed image can be sharp without any blurred outline.

On the surface of the counter substrate 1 facing the display medium 2, transparent electrodes 5 serving as data lines are formed in the shape of stripes extending, when seen in the normal direction of the substrate, in the perpendicular direction to the channels 13. When the transparent electrodes are formed on the dielectric film 16 facing the display medium 2 so as to correspond to the respective pixels, the transparent electrodes 5 can be formed on the substantially entire surface of the counter substrate 1 without any separation.

The display medium 2 includes polymer regions 3 and liquid crystal regions 4, in which the liquid crystal molecules are axisymmetrically aligned. The polymer regions 3 are formed preferably as walls for surrounding the liquid crystal regions 4. The axisymmetrical alignment can be attained, for example, in the following manner: The liquid crystal molecules are aligned in the shape of a spiral on one substrate, and in the shape of a reverse spiral on the other substrate; or the liquid crystal molecules are aligned so that the alignment directions on the respective substrates are perpendicular to each other by adopting the combination of a concentric alignment state on one substrate and a radial alignment state on the other substrate. When such axisymmetrical alignment is adopted, there is no need to conduct a rubbing treatment, and hence, there is no possibility of causing damage to the liquid crystal display device (for example, damage of the dielectric film) by the rubbing treatment.

A liquid crystal material for the liquid crystal region 4 is an organic mixture exhibiting a liquid crystalline behavior around room temperature and can be any of the known materials. Examples of an adoptable liquid crystal mode include nematic liquid crystal, cholesteric liquid crystal, smectic liquid crystal, ferroelectric liquid crystal and discostic liquid crystal. One or a mixture of two or more of these liquid crystal modes can also be used. For example, liquid crystal materials MLC-6069, ZLI-4427 and ZLI-4792 (manufactured by Merck & Co., Inc.) can be used.

As a polymerizable material forming the polymer region 3, any of compounds polymerizable through light irradiation can be used. Examples of the polymerizable material include R-684 (manufactured by Nippon Kayaku Co., Ltd.), p-phenyl styrene, isobornyl methacrylate, and perfluoro methacrylate. One or a combination of two or more of these compounds can be used. Furthermore, the polymerizable material can include a polymerization initiator if necessary. As the polymerization initiator, for example, Irgacure 651 (manufactured by Ciba Geigy Corporation) can be used.

The polymer region 3 preferably includes a light absorbing agent. When the polymer region 3 is allowed to include the light absorbing agent, light passing through the polymer region 3 can be absorbed, thereby preventing a displayed image from becoming rough.

The walls 12 can be made from, for example, an insulating resist. The shape of the walls can be varied depending upon the application of the liquid crystal display device, but the walls preferably have a height of about 150 through 250 $\mu$m and a width of about 20 to 100 $\mu$m. The pitch between the adjacent walls is preferably about 100 through 500 $\mu$m.

As the dielectric film 16, for example, a plastic substrate, a thin glass plate or a polymeric film can be used. The thickness of the dielectric film can be varied depending upon the material used for the dielectric film, and the structure and the desired application of the liquid crystal display device. For example, when a thin glass plate is used, the thickness is preferably about 60 through 20 $\mu$m, and when a polymeric film is used, the thickness is preferably about 60 through 20 $\mu$m. At least one of the surfaces of the dielectric film, preferably its surface facing the plasma generation substrate, is optimally coated with an inorganic 17 material such as $SiO_2$. When the dielectric film is coated with an inorganic material, the weatherability of the dielectric film can be improved, resulting in achieving a stable operation of the liquid crystal display device.

The ionization gas can be any dischargeable gas such as argon, helium, neon or a mixture of two or more of these gasses.

The present liquid crystal display device can include a polarizing plate if necessary, and the invention is also characterized by the position of the polarizing plate. The position of the polarizing plate will now be described referring to FIGS. 2A and 2B.

Figure 2A:
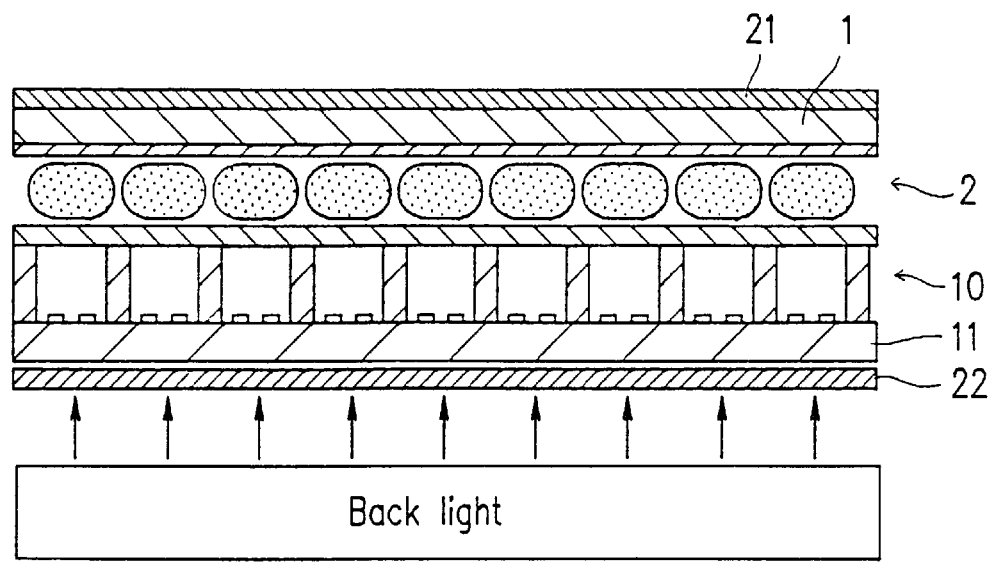
FIG. 2A is a schematic sectional view for showing another example of the liquid crystal display device of the invention.
Figure 2B:
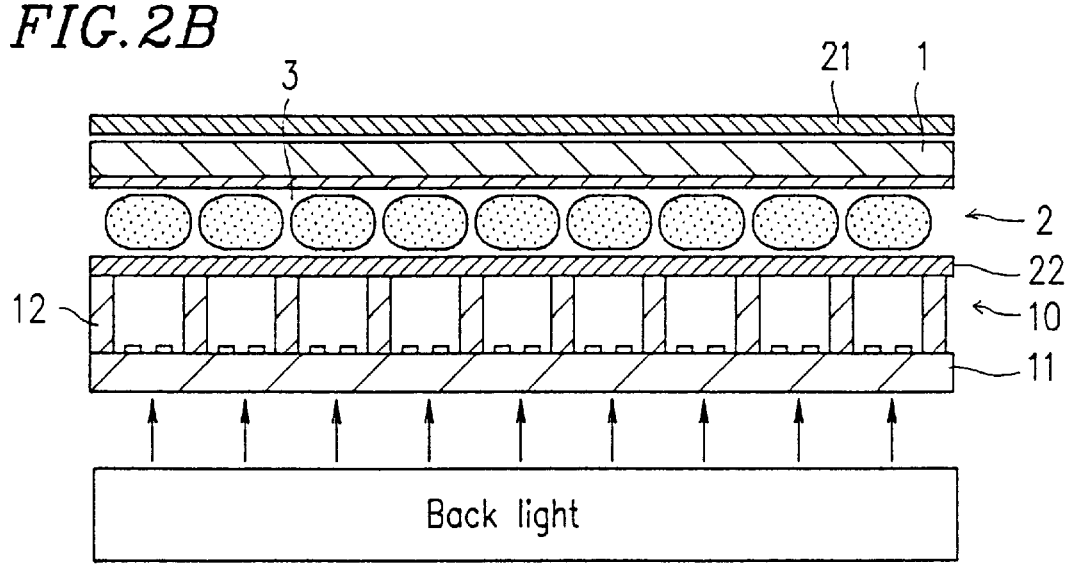
FIG. 2B is a schematic sectional view for showing still another example of the liquid crystal display device of the invention.

In the present liquid crystal display device, polarizing plates 21 and 22 can be disposed, similarly to a conventional liquid crystal display device, on the outer surfaces of the counter substrate 1 and the plasma generation substrate 10 as is shown in FIG. 2A. Alternatively, one polarizing plate 22 can be disposed between the plasma generation substrate 10 and the display medium 2 with the other polarizing plate 21 disposed on the outer surface of the counter substrate 1 as is shown in FIG. 2B. In other words, the polarizing plate can work as a dielectric film in this liquid crystal display device. This is because the display medium 2 of this liquid crystal display device includes a large number of polymer regions 3, and hence, the cell thickness can be satisfactorily retained even when the dielectric film is replaced with the polarizing plate. The surface of the polarizing plate 22 facing the plasma generation substrate 10 is preferably coated with an inorganic material such as $SiO_2$. When the polarizing plate is disposed between the plasma generation substrate 10 and the display medium 2, the light leakage from a point having a different refractive index can be prevented. When the polarizing plate 22 is thus positioned, transparent electrodes are preferably formed on the surface of the polarizing plate facing the display medium 2 correspondingly to the respective pixels.

Furthermore, since the display medium 2 includes a large number of polymer regions 3 so that the cell thickness can be satisfactorily retained, a polymeric film having a low mechanical strength can be used as the dielectric film. When the polymeric film is used as the dielectric film, the thickness of the entire liquid crystal display device can be decreased. In addition, as a result of the decrease of the thickness of the liquid crystal display device, the capacity is increased and a large potential difference can be obtained. Thus, a very sharp image can be displayed. When the polymeric film is used as the dielectric film, transparent electrodes are preferably formed on the surface of the polymeric film facing the display medium 2 correspondingly to the respective pixels.

Now, the direction of the polarizing axis of the polarizing plate will be described.

Figure 3A:
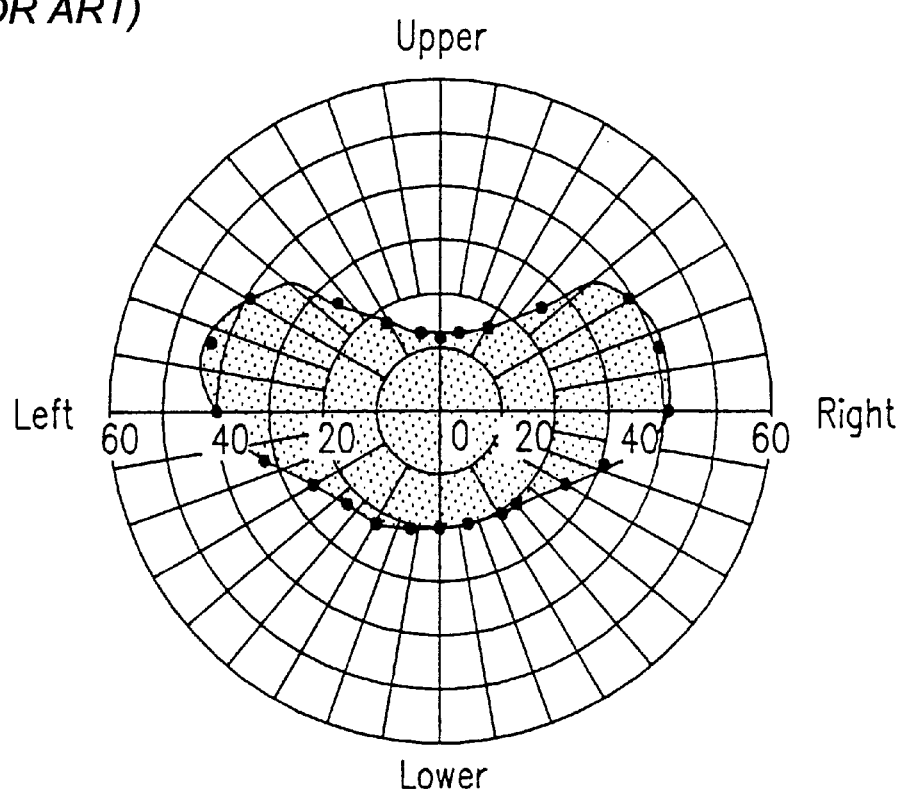
FIG. 3A is a radar chart for showing the viewing angle characteristic of a conventional liquid crystal display device.
Figure 3B:
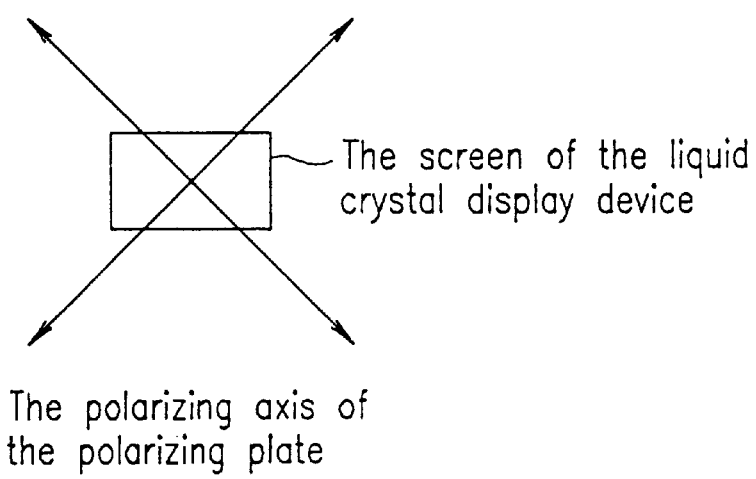
FIG. 3B is a schematic diagram for illustrating the direction of the polarizing axis in adhering a polarizing plate to a liquid crystal cell in the liquid crystal display device having the viewing angle characteristic as shown in FIG. 3A.

It is known that the light leakage from the point having a different refractive index (for example, the adhesion point between the plasma generation substrate 10 and the dielectric film 16) is maximum when the angle between the polarizing axis of the polarizing plate and the longitudinal or latitudinal direction of the plane having the refractive index difference is 45° when seen in the normal direction of the display device, and is minimum when the angle is 0° or 90°. Since the liquid crystal display device of the general TN mode has the viewing angle characteristic as is shown in FIG. 3A, the polarization axes of the polarizing plates are generally inclined at an angle of 45° respectively against the longitudinal direction and the latitudinal direction of the screen of the liquid crystal display device as is shown in FIG. 3B. Since the PALC is provided with the plasma generation channels which can cause a difference in the refractive index in the longitudinal or latitudinal direction, the PALC is the most disadvantageous when combined with the liquid crystal of the TN mode (namely, the light leakage is the maximum in the PALC).

Figure 4A:
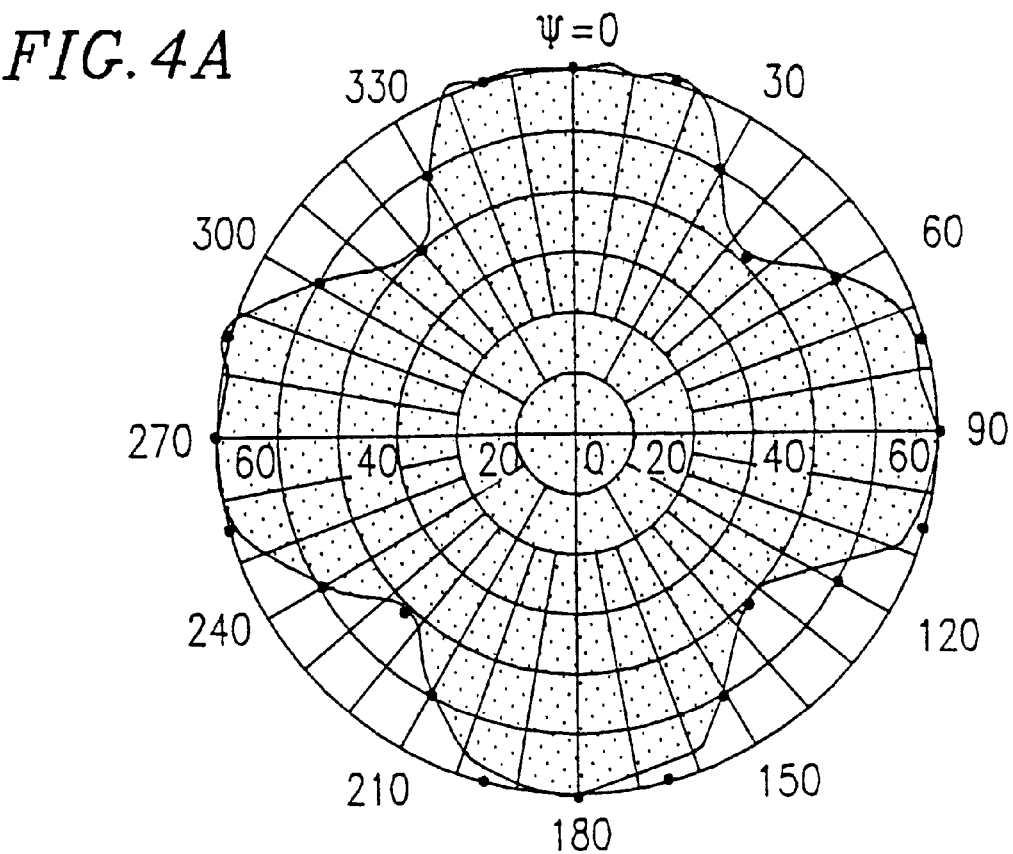
FIG. 4A is a radar chart for showing an exemplified viewing angle characteristic of the liquid crystal display device of this invention.
Figure 4B:
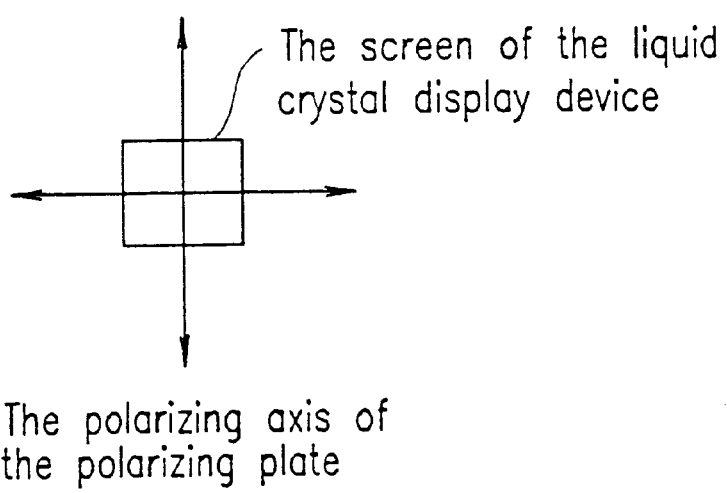
FIG. 4B is a schematic diagram for illustrating the direction of the polarizing axis in adhering a polarizing plate to a liquid crystal cell in the liquid crystal display device having the viewing angle characteristic as shown in FIG. 4A.
Figure 5A:
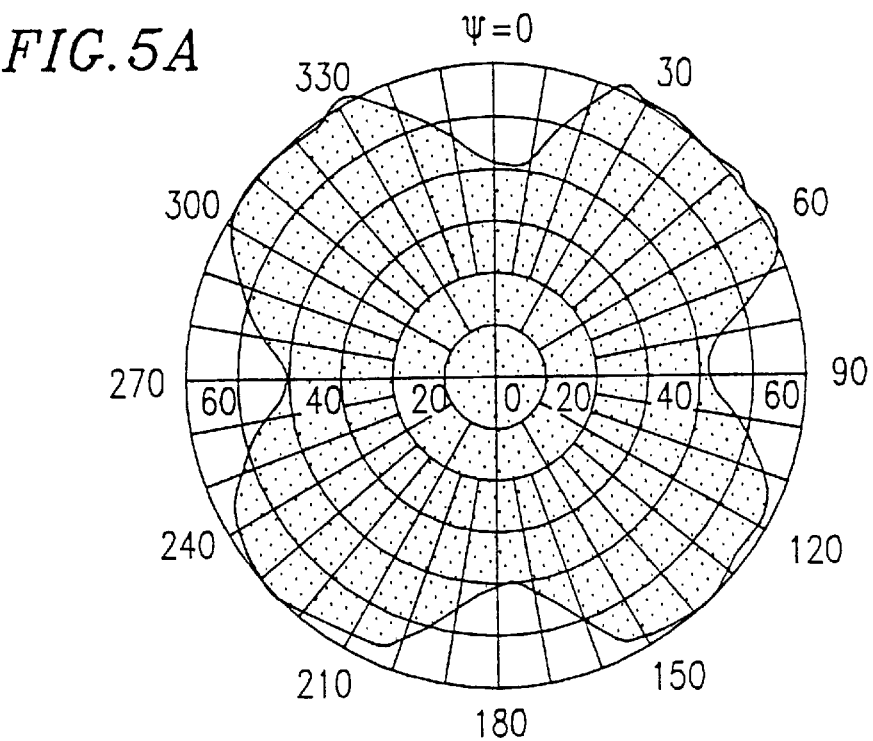
FIG. 5A is a radar chart for showing another exemplified viewing angle characteristic of the liquid crystal display device of this invention.
Figure 5B:
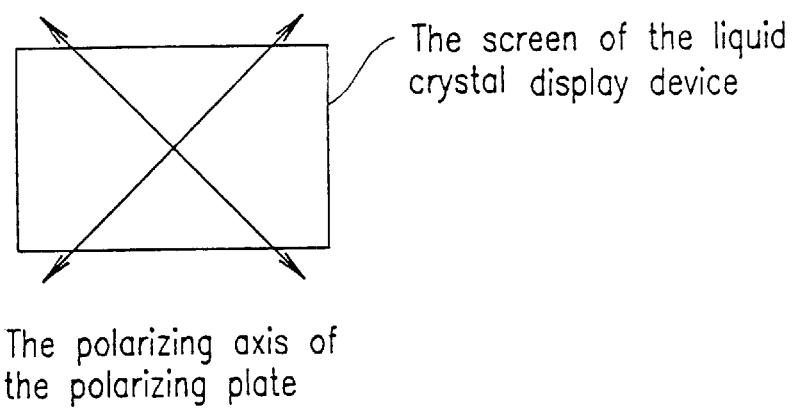
FIG. 5B is a schematic diagram for illustrating the direction of the polarizing axis in adhering a polarizing plate to a liquid crystal cell in the liquid crystal display device having the viewing angle characteristic as shown in FIG. 5A.

Meanwhile, since the present liquid crystal display device comprises the display medium 2 including the polymer regions 3 and having the viewing angle characteristic of an axisymmetrical display (ASM) mode as is shown in FIG. 4A, the polarizing plates can be disposed with their polarizing axes respectively according to the longitudinal direction and the latitudinal direction of the liquid crystal display device. Accordingly, in contrast with the general TN mode liquid crystal display device, the present PALC and the polarizing plates can be combined very satisfactorily. Furthermore, even through the viewing angle characteristic of the display medium 2 of the present liquid crystal display device is the axisymmetrical display mode, in which the viewing angle characteristic is shifted from that shown in FIG. 4A by a degree of 45° as is shown in FIG. 5A, the polarizing plates can be disposed at an angle of 45° respectively against the longitudinal direction and the latitudinal direction of the liquid crystal display device as is shown in FIG. 5B in accordance with the shifted viewing angle characteristic.

Figure 6A:
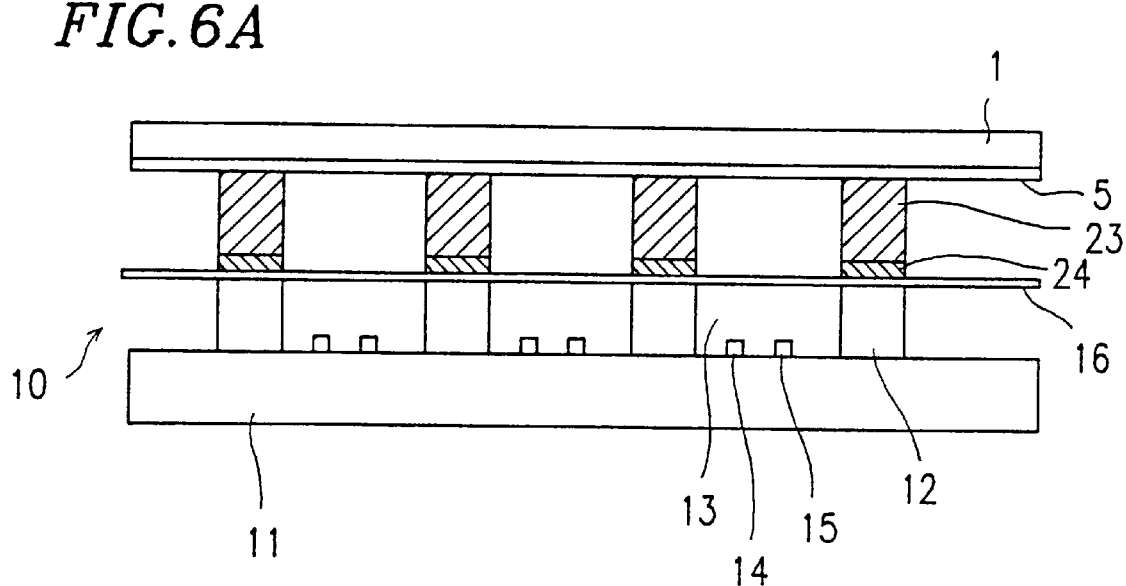
FIG. 6A is a schematic sectional view for showing still another example of the liquid crystal display device of the invention.

Another example of the liquid crystal display device of this invention will now be described. FIG. 6A is a schematic sectional view of this liquid crystal display device. This liquid crystal display device comprises wall-like spacers 23 between a plasma generation substrate 10 and a counter substrate 1 so as to cross at least one of walls 12 for partitioning channels 13. The liquid crystal display device of FIG. 6A further comprises an intermediate layer 24 between the wall-like spacer 23 and the plasma generation substrate 10. Alternatively, the intermediate layer 24 can be formed so as to cover the entire exposed surface of the wall-like spacer 23 as is shown in FIG. 6B.

Figure 6B:
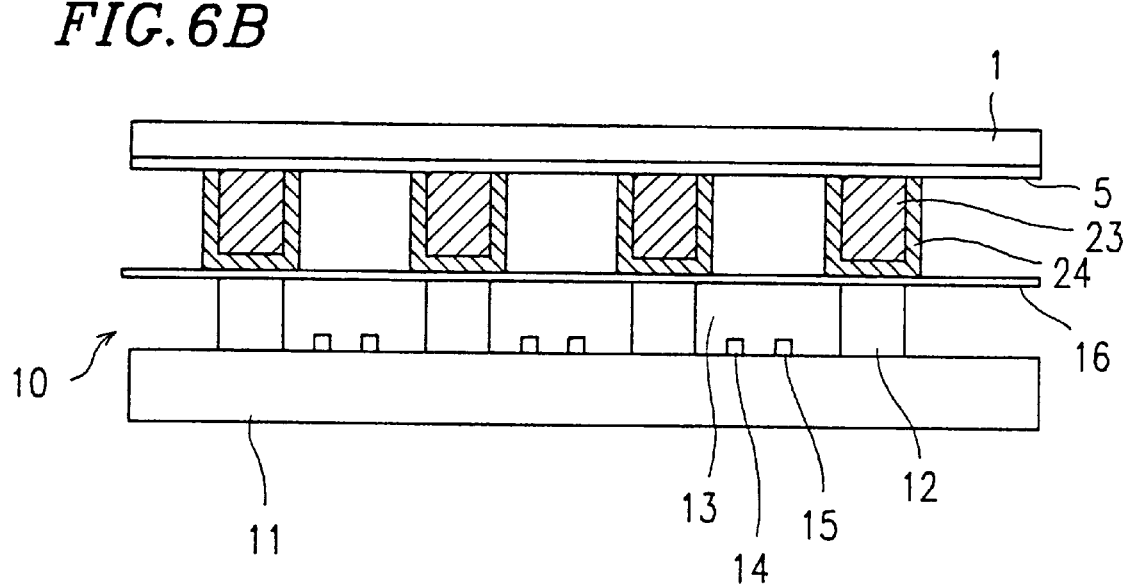
FIG. 6B is a schematic sectional view for showing still another example of the liquid crystal display device of the invention.

In the liquid crystal display devices of FIGS. 6A and 6B, the wall-like spacer 23 is disposed to be orthogonal to at least one of the walls 12 for partitioning the channels 13 as is shown in FIG. 7. This is for the following reason: On the plasma generation substrate 10, a dielectric film 16 is supported by the stripe-shaped walls 12. Therefore, when the wall-like spacer 23 is formed so as not to cross any of the walls 12, a shearing force can be applied to the dielectric film 16 and the dielectric film 16 can be damaged. In the present liquid crystal display devices, the damage of the dielectric film 16 can be avoided by disposing the wall-like spacer 23 orthogonally to at least one of the stripe-shaped walls 12. This results in a liquid crystal display device having excellent strength. The wall-like spacer 23 can cross one or more of the walls 12, and the liquid crystal display device can include a plurality of wall-like spacers 23, each crossing a different number of the walls 12.

In the present liquid crystal display device, the wall-like spacer 23 preferably has high elasticity in order to adhere the two substrates to each other and retain the cell thickness. As a material for the wall-like spacer, for example, photosensitive materials (such as a resist and photosensitive polyimide) and an epoxy acrylate type resin, which can be selectively formed at a desired position, can be used. When such a material having a positional selectivity is used, the wall-like spacer can be selectively formed with ease in areas excluding pixel regions. For example, by controlling the irradiation conditions, the wall-like spacer can be formed on a black mask which is provided for making the boundaries clear between color layers of R, G and B in color filters.

The intermediate layer 24 can be made from a polymeric material. Preferably, the intermediate layer is made from a polymeric material having a lower softening point than that of the material for the wall-like spacer. The softening point herein means a glass transition point (Tg) when an amorphous material is adopted as the polymeric material, and a melting point when a crystalline material is adopted. When such an intermediate layer is disposed between the wall-like spacer and the plasma generation substrate as is shown in FIG. 6A or 6B, the plasma generation substrate can be easily adhered to the counter substrate for the following reason: During the fabrication of the liquid crystal cell, the temperature is increased to exceed the softening point of the material for the intermediate layer, thereby softening the intermediate layer. Thus, the intermediate layer is provided with the adhesive property, and hence, the plasma generation substrate and the counter substrate can be adhered to each other by applying a pressure. The heating temperature for the adhesion can be varied depending upon the material for the intermediate layer, however, it is preferably about 170 to 150° C. The pressure applied for the adhesion is preferably about 10 to 30 g/cm$^2$.

Alternatively, the intermediate layer can be replaced with an adhesive agent. In adopting the adhesive agent, the plasma generation substrate and the counter substrate can be adhered at room temperature differently from the case where the intermediate layer is formed. Therefore, a UV-curable resin can be used as a sealing material in the fabrication of the liquid crystal cell. As a method of applying the adhesive agent, a tack-off method can be used.

In the present liquid crystal display device, the polymer regions of the display medium have the function to hold the plasma generation substrate and the counter substrate, and hence, the liquid crystal display device can be applied to a large screen while retaining its cell thickness. Additionally, since the liquid crystal molecules in the liquid crystal regions of the display medium are axisymmetrically aligned, a liquid crystal display device with a large screen having an excellent viewing angle characteristic can be obtained.

Furthermore, since the polymer regions of the display medium have the function of holding the plasma generation substrate and the counter substrate in the present liquid crystal display device, a polymeric film having a very small thickness (namely, having a low mechanical strength) can be used as the dielectric film disposed between the channels and the display medium. The usage of the polymeric film can decrease the thickness of the entire liquid crystal display device. In addition, as the result of the decrease of the thickness of the liquid crystal display device, the capacity can be increased and a large potential difference can be obtained, resulting in realizing a very clear image. Alternatively, a polarizing plate can be used as the dielectric film. This is because the cell thickness can be satisfactorily retained even by the polarizing plate owing to the presence of the polymer regions. The usage of the polarizing plate as the dielectric film can prevent the light leakage from the point having a different refractive index.

Moreover, since the liquid crystal molecules in the liquid crystal regions are axisymmetrically aligned, the present liquid crystal display device is excellent in the viewing angle characteristic in the direction along the polarizing axis of the polarizing plate. This enables the polarizing plate to be positioned with its polarizing axis according to the longitudinal or latitudinal direction of the screen. Accordingly, light leakage from the plasma channels and the like can be prevented, resulting in realizing a PALC with a high contrast.

In a preferred embodiment, the wall-like spacer is provided between the plasma generation substrate and the counter substrate so as to cross at least one of the walls for partitioning the channels. Therefore, even when a stress is applied to the wall-like spacer during the fabrication of the liquid crystal cell and the injection of the material for the display medium, the stress can be released by the wall orthogonal to the wall-like spacer. This can prevent the damage of the member disposed between the channels and the display medium. Furthermore, when an elastic material which can release a stress is used as the material for the wall-like spacer, the effect attained by the wall-like spacer can be further enhanced.

In a method for manufacturing the liquid crystal display device of this invention, a polymeric material having a lower softening point than that of the material for the wall-like spacer is disposed between the wall-like spacer and the plasma generation substrate. As a result, the plasma generation substrate can be adhered with ease to the counter substrate for the following reason: By increasing the temperature to exceed the softening point of the polymeric material in the fabrication of the liquid crystal cell, the polymeric material is softened so as to attain the adhesive property. Therefore, the plasma generation substrate can be adhered to the counter substrate by applying a pressure. In addition, when an adhesive agent is used as the polymeric material, the plasma generation substrate can be adhered to the counter substrate at room temperature.

The present liquid crystal display device can be suitably used for a high quality television set such as HDTV, a plane display for CAD and the like.

EXAMPLES

The present invention will now be described by means of examples, to which the invention is not limited.

Example 1

Figure 8:
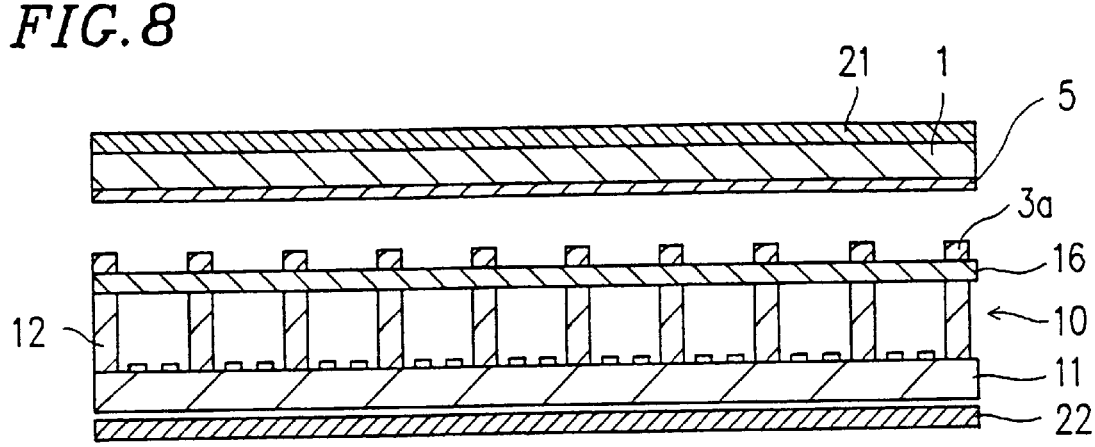
FIG. 8 is a schematic sectional view of a liquid crystal display device according to Example 1.

FIG. 8 is a schematic sectional view of a liquid crystal display device of Example 1, in which a plasma generation substrate 10 is not yet adhered to a counter substrate 1. The manufacturing procedures for this liquid crystal display device will now be described.

Figure 9A:
FIGS. 9A and 9B are a schematic sectional view and a plan view of a dielectric film used in the liquid crystal display device of Example 1, respectively.
Figure 9B:
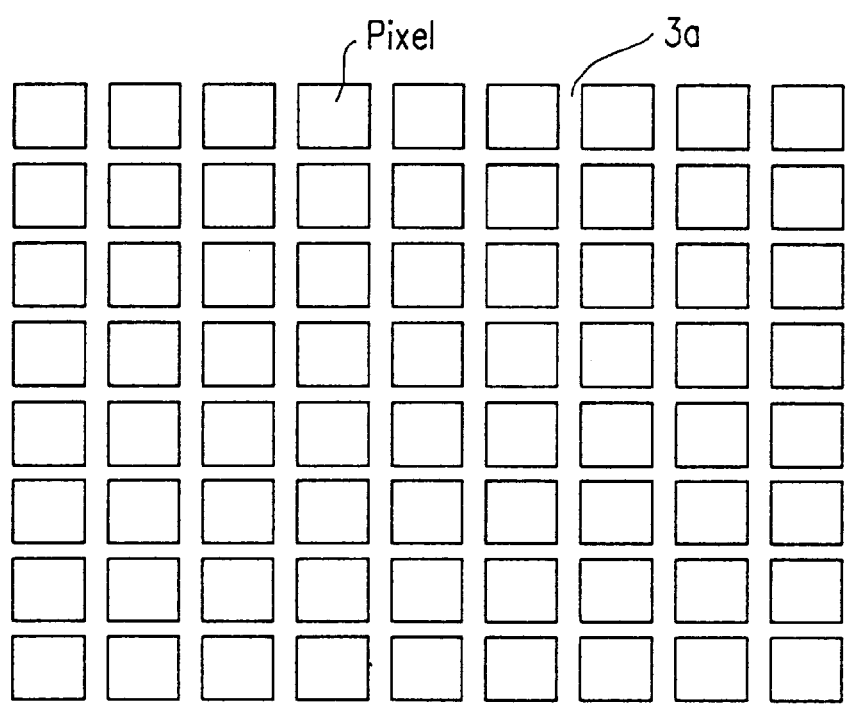

On a plastic substrate 11 with one surface coated with $SiO_2$, a plurality of electrode pairs each including an anode electrode and a cathode electrode were formed. Walls 12 with a height of approximately 200 $\mu$m were formed out of an insulating resist on the substrate 11 so as to partition the respective electrode pairs. The walls 12 were formed by laminating a plurality of polymeric films. An adhesive agent was applied on the top surface of each of the walls 12, and another plastic substrate (i.e., a dielectric film) 16 with one surface coated with $SiO_2$ was adhered to the walls 12, thereby fabricating the plasma generation substrate 10 having plasma chambers (plasma generation channels). Before the adhesion of the substrates, walls 3a corresponding to polymer walls serving also as a spacer were previously formed out of, for example, a resist in a pattern as is shown in FIGS. 9A and 9B on the other surface of the dielectric film 16 which was not coated with $SiO_2$. Each area surrounded by the walls 3a corresponds to a pixel.

Next, the counter substrate 1 of ITO bearing stripe-shaped electrodes 5 extending perpendicular to the plasma chambers and resist walls (corresponding to the walls 3a shown in FIGS. 9A and 9B; not shown) was adhered to the plasma generation substrate 10 so that the walls 3a (i.e., the spacer) could be interposed therebetween as is shown in FIG. 8. Then, an argon gas was sealed within the plasma chambers. The adhesion of the substrates 1, 11 and 16 can be conducted at different times or simultaneously. A cell was thus fabricated.

Then, into the cell, a homogeneous mixture including the following compounds was injected: 0.20 g of R-684 (manufactured by Nippon Kayaku Co., Ltd.), 0.20 g of p-phenyl styrene, 0.10 g of a compound represented by the following Formula (I), 4.5 g of a liquid crystal material, ZLI-4792 (manufactured by Merck & Co., Inc.; $\Delta n=0.094$) and 0.025 g of a photopolymerization initiator, Irgacure 651 (manufactured by Ciba Geigy Corporation).

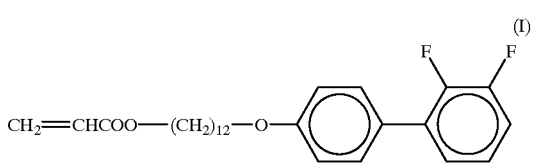

(I)

Then, the mixture was heated to a temperature at which it was in a homogeneous isotropic liquid phase (for example, about 100° C.), and then cooled to a temperature of about 80° C., thereby forming one liquid crystal region in each pixel. A voltage of ±5.0 V was then applied between the transparent electrodes, thereby axisymmetrically aligning the liquid crystal molecules in each liquid crystal region. Under this condition, the cell was cooled to room temperature. In order to fix this alignment state, the cell was irradiated with UV at the intensity of 3 mW/cm² for 30 minutes by using a high pressure mercury lamp (having a wavelength of 365 nm). The cell was continuously irradiated with UV for another 20 minutes, thereby polymerizing the resin.

Figure 10:
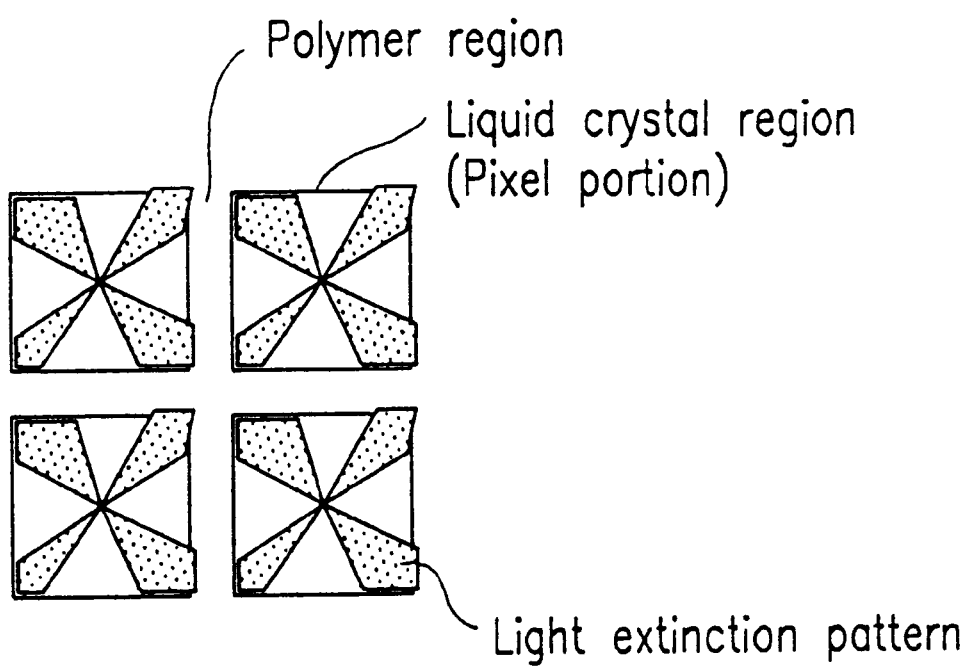
FIG. 10 is a schematic diagram for illustrating the display state of a liquid crystal region in the liquid crystal display device of Example 1.

FIG. 10 illustrates the pixels of the thus manufactured liquid crystal cell as observed through a polarizing microscope. As is shown in FIG. 10, the liquid crystal regions were formed in accordance with the pattern of the walls 3a, and the liquid crystal molecules in each liquid crystal region were observed to be axisymmetrically aligned with the central axis as the center of the symmetry, namely, aligned in two or more directions.

Then, polarizing plates 21 and 22 were respectively adhered to both outer surfaces of the liquid crystal cell with their polarizing axes according to the longitudinal direction and the latitudinal direction of the liquid crystal cell. Thus, the liquid crystal display device of this example was manufactured.

The liquid crystal display device manufactured as described above exhibited the wide and axisymmetrical viewing angle characteristic as is shown in FIG. 4A. In addition, since the plasma chambers and the polarizing axes of the polarizing plates extended in the same direction, the light leakage could be suppressed.

Example 2

A liquid crystal display device as shown in FIG. 2B was manufactured in the same manner as described in Example 1 except that the dielectric film 16 was replaced with a polarizing plate with both surfaces coated with $SiO_2$, and hence no polarizing plate was disposed on the outer surface of the plasma generation substrate.

Since this liquid crystal display device included the polarizing plate within the liquid crystal cell, the thickness thereof could be remarkably decreased as compared with the conventional plasma address liquid crystal display device. In addition, light was prevented from leaking from the plasma channels, and the like, in this liquid crystal display device, resulting in attaining a high contrast.

Comparative Example 1

A plasma address liquid crystal display device of the general TN mode was manufactured as follows:

A cell was fabricated in the same manner as in Example 1. In order to attain the TN mode display, an alignment film was formed within the cell and subjected to a rubbing treatment. Then, a liquid crystal material was injected into the cell, and the cell was heated and gradually cooled, thereby obtaining a liquid crystal cell of the TN mode. To both outer surfaces of the liquid crystal cell, polarizing plates were adhered with their polarizing axes inclined at an angle of 45° against the longitudinal or latitudinal direction of the liquid crystal cell. Thus, the TN mode plasma address liquid crystal display device was completed.

This liquid crystal display device had the viewing angle characteristic as shown in FIG. 3A, which was very small as compared with that of Example 1. In addition, line-like light leakage from an adhesion point between the substrates was observed, and the contrast was low. Moreover, since no polymer region was formed in the display medium, the force to retain the cell thickness was insufficient, and hence, the counter substrate was pulled toward the plasma generation substrate, causing a line-like display irregularity.

Example 3

Figure 11A:
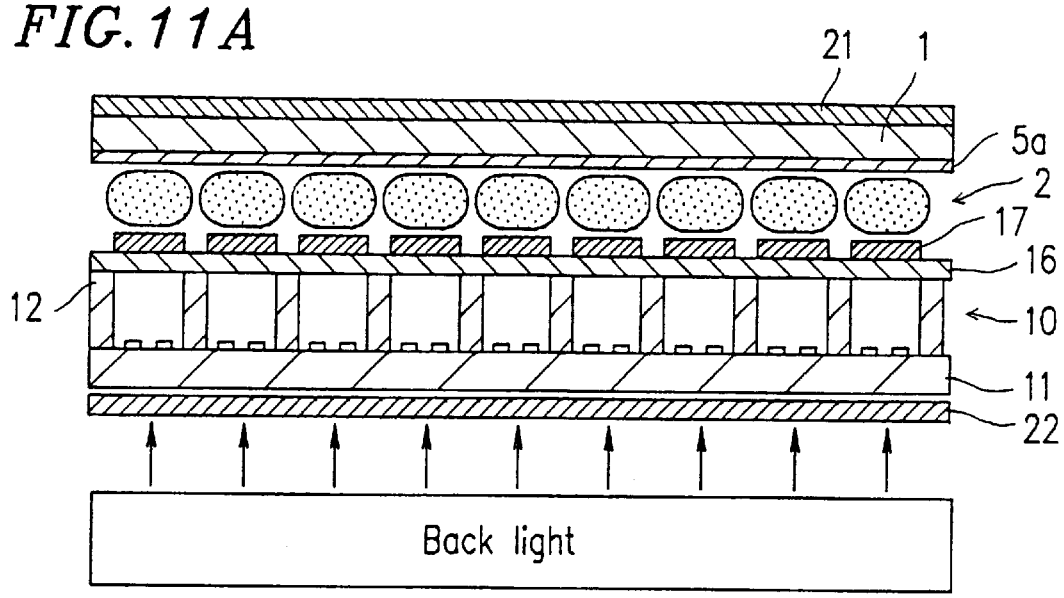
FIG. 11A is a schematic sectional view for showing a liquid crystal display device according to Example 3.
Figure 11B:
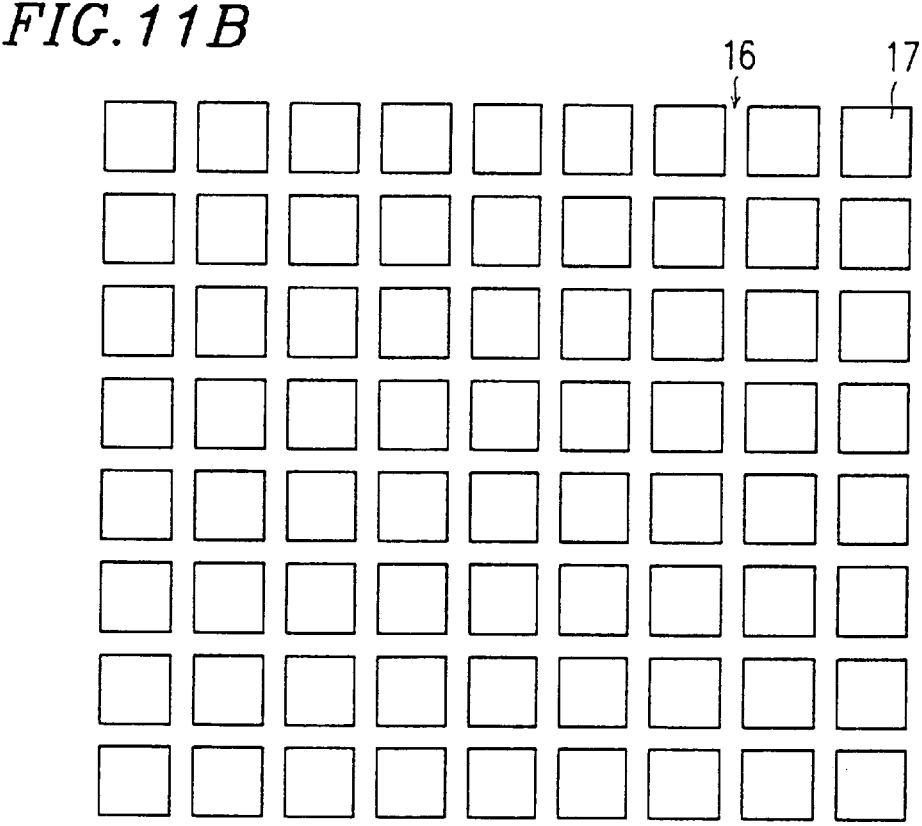
FIG. 11B is a schematic plan view for showing electrodes provided in the liquid crystal display device of Example 3.
Figure 12A:
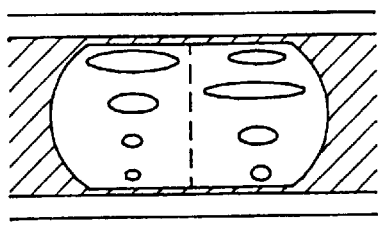
FIGS. 12A through 12C are schematic diagrams for showing the directions of liquid crystal molecules in a liquid crystal display device of a wide viewing angle mode.
Figure 12D:
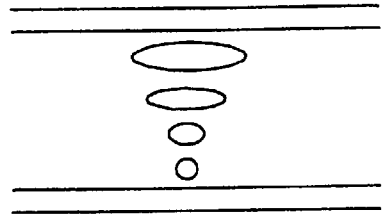
FIGS. 12D through 12F are schematic diagrams for showing the directions of liquid crystal molecules in a liquid crystal display device of the TN mode.
Figure 12B:
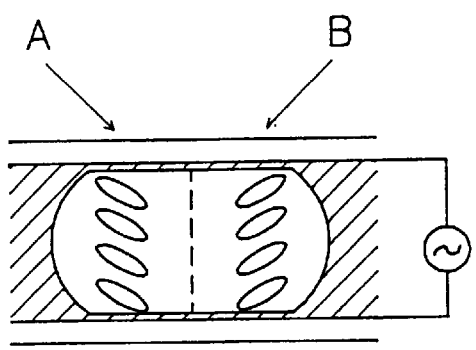
Figure 12E:
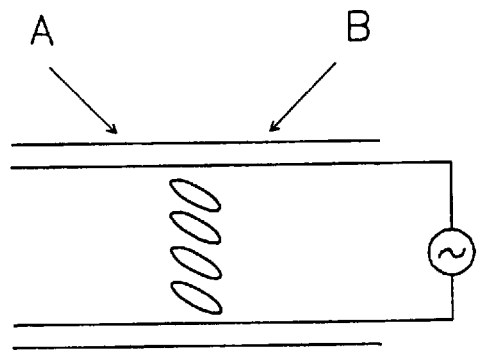
Figure 12C:
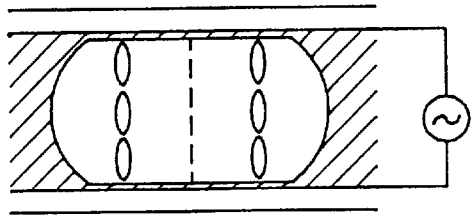
Figure 12F:
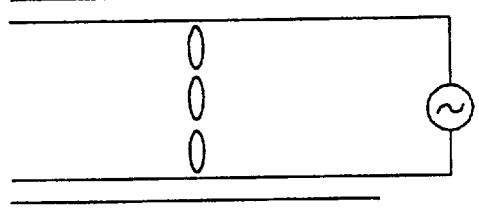
Figure 13:
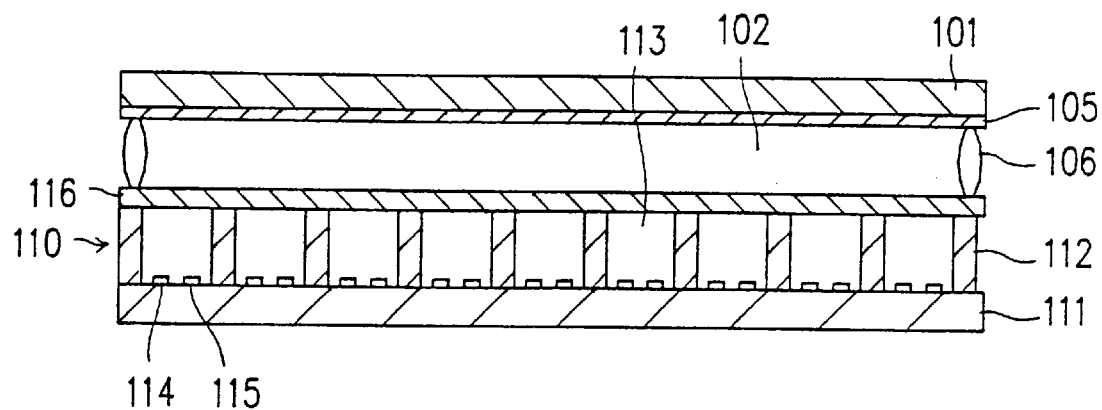
FIG. 13 is a schematic sectional view for showing a conventional plasma address liquid crystal display device.
Figure 14A:
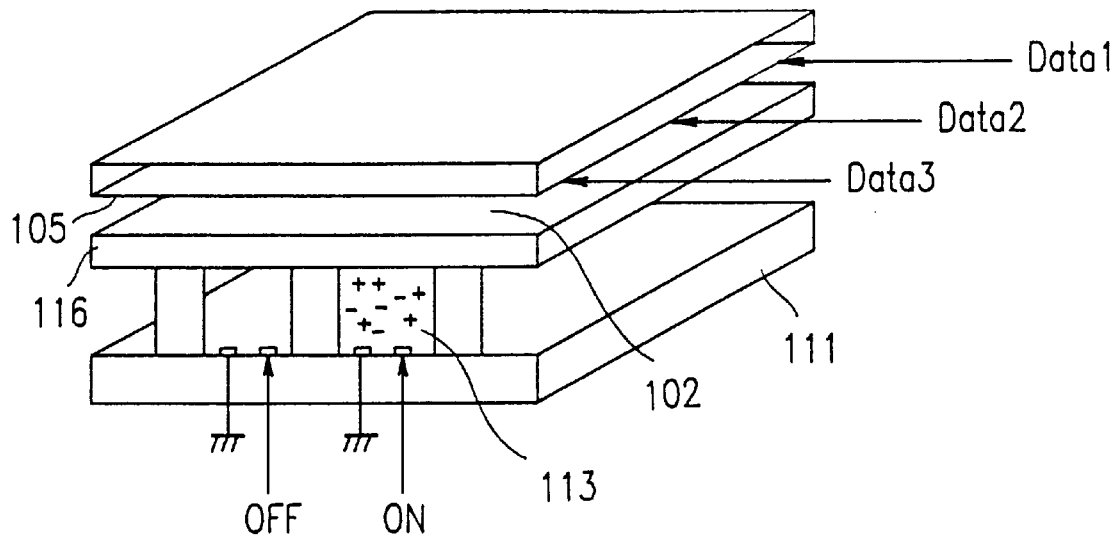
FIGS. 14A and 14B are schematic diagrams for illustrating the switching operation in the plasma address liquid crystal display device.
Figure 14B:
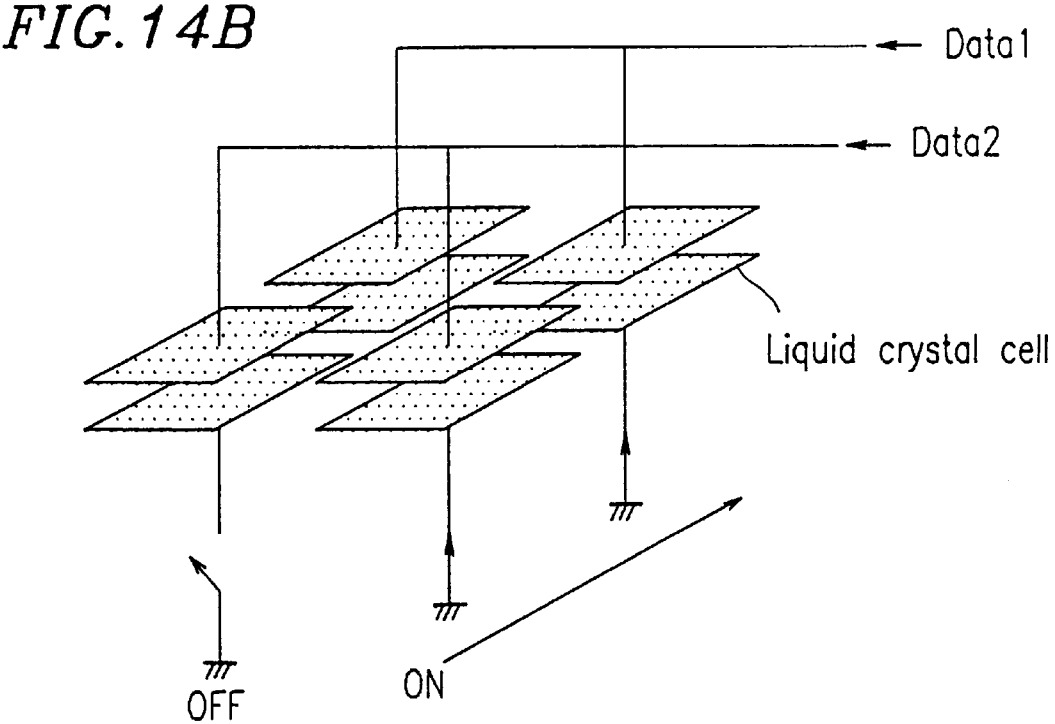
Figure 15:
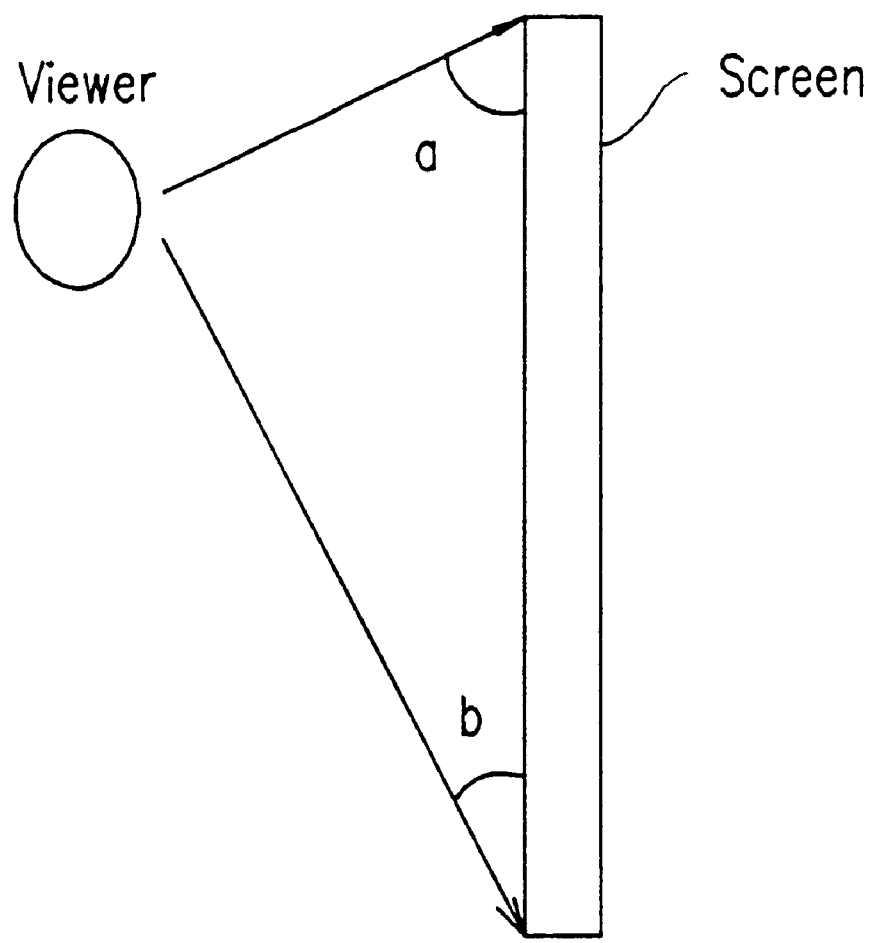
FIG. 15 is a schematic diagram for illustrating a problem of a display apparatus with a large screen utilizing the conventional plasma address liquid crystal display device that the display state is largely varied depending upon the position of a viewer.

A liquid crystal display device as is shown in FIGS. 11A and 11B was manufactured in the same manner as described in Example 1 except that transparent electrodes corresponding to respective pixels were formed instead of the walls 3a on the surface of the dielectric film 16 facing the display medium.

In this liquid crystal display device, a voltage could be applied to the display medium in each pixel (i.e., each liquid crystal region), and hence, charges could be suppressed from spreading in aligning the liquid crystal molecules. Accordingly, in generating charges by using plasma, the direction of an electric field scarcely deviated from the longitudinal direction of the liquid crystal display device because the charges did not spread. As a result, the liquid crystal molecules were very satisfactorily aligned in all the pixels. Furthermore, since the spread of the charges was suppressed, a very clear image could be displayed.

Example 4

A liquid crystal display device as is shown in FIGS. 6A and 7 was manufactured in the following manner:

On a glass substrate 11, a plurality of electrode pairs each including an anode electrode and a cathode electrode were formed. Walls 12 with a height of approximately 200 μm were formed out of an insulating resist so as to partition the respective electrode pairs. The walls 12 were formed by laminating a plurality of polymeric films. An adhesive agent was applied on the top surfaces of the walls 12, and a thin glass plate 16 was adhered to the walls 12, thereby obtaining a plasma generation substrate 10 having plasma chambers (plasma generation channels).

Next, on a counter substrate 1 of ITO bearing stripe-shaped transparent electrodes 5, wall-like spacers 23 with a predetermined height (6 μm in this example) were formed out of photosensitive polyimide. The wall-like spacers 23 have the same function as that of the walls 3a shown in FIG. 8. To the top surfaces of the wall-like spacers 23, for example, an epoxy adhesive agent was applied by a lift-off method. The lift-off method is a technique in which, for example, a methyl isobutyl ketone solution of the epoxy adhesive agent is spin-coated on a polyimide film, and the solution is transferred to the top surfaces of the wall-like spacers by using a rubber roller, or the like.

The counter substrate 1 was then adhered to the plasma generation substrate 10, thereby completing a cell. The adhesion of the substrate 1, 11 and 16 can be conducted at different times or simultaneously. An argon gas was then sealed in the channels 13 of the plasma generation substrate 10.

Into the thus manufactured cell, a homogenous mixture including the following compounds was injected by, for example, capillary injection: 0.20 g of R-684, 0.20 g of p-phenyl styrene, 0.10 g of the compound represented by Formula (I), 4.5 g of the liquid crystal material, ZLI-4792 (manufactured by Merck & Co., Inc.; Δn=0.094) and 0.025 g of the photopolymerization initiator, Irgacure 651.

The procedures thereafter were conducted in the same manner as described in Example 1, thereby completing the liquid crystal cell.

When a stress was applied to the liquid crystal cell under observation through a polarizing microscope, the cell thickness was observed to be scarcely varied. Furthermore, the dielectric film (the thin glass plate 16 in this example) disposed between the display medium and the channels was not damaged by the stress.

By using this liquid crystal cell, a liquid crystal display device was manufactured in the same manner as described in Example 1. This liquid crystal display device also had a wide and axisymmetrical viewing angle characteristic.

As described above, the polymer regions of the display medium of the present liquid crystal display device have the function of holding the plasma generation substrate and the counter substrate. Therefore, the liquid crystal display device can be applied to a large screen while the cell thickness can be retained at a fixed value. In addition, the liquid crystal molecules in the liquid crystal regions of the display medium are axisymmetrically aligned, and hence, a liquid crystal display device with a large screen having an excellent viewing angle characteristic can be realized.

Preferably, the wall-like spacer is provided between the plasma generation substrate and the counter substrate so as to cross at least one of the walls for partitioning the channels. The wall-like spacer can prevent the damage of the member disposed between the channels and the display medium.

Furthermore, the invention provides a simple method for manufacturing such a liquid crystal display device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for manufacturing a liquid crystal display device including a display medium sandwiched between a plasma generation substrate having channels for generating plasma and a counter substrate, the display medium including liquid crystal regions and polymer regions, liquid crystal molecules in the liquid crystal regions being axisymmetrically aligned, and a wall-like spacer being formed so as to cross at least one of walls for partitioning the channels, the method comprising the steps of:

forming the wall-like spacer on the counter substrate; and adhering the counter substrate bearing the wall-like spacer to the plasma generation substrate.

2. The method for manufacturing a liquid crystal display device according to claim 1, wherein the step of adhering the counter substrate to the plasma generation substrate includes the steps of:

previously disposing a polymeric material having a lower softening point than a material for the wall-like spacer between the wall-like spacer and the plasma generation substrate;

adhering the counter substrate to the plasma generation substrate; and applying a pressure to the adhered substrates at a temperature exceeding the softening point of the polymeric material.

3. A liquid crystal display device comprising a display medium sandwiched between a plasma generation substrate having channels for generating plasma and a counter substrate, said display medium including liquid crystal regions and polymer regions, wherein liquid crystal molecules in the liquid crystal regions are axisymmetrically aligned;

said channels having a dielectric film which separates the channels from the display medium and an inorganic film formed on a surface of the dielectric film facing the channels; and wherein transparent electrodes are disposed on a surface of the dielectric film facing the display medium correspondingly to respective pixels.

4. A liquid crystal display device comprising a display medium sandwiched between a plasma generation substrate having channels for generating plasnma and a counter substrate, said display medium including liquid crystal regions and polymer regions, wherein liquid crystal molecules in the liquid crystal regions are axisymmetrically aligned; and wherein said channels have a polarizing plate for separating the channels from the display medium.

5. The liquid crystal display device according to claim 4, wherein transparent electrodes are disposed on a surface of the polarizing plate facing the display medium correspondingly to respective pixels.

6. A liquid crystal display device comprising a display medium sandwiched between a plasma generation substrate having channels for generating plasma and a counter substrate, said display medium including liquid crystal regions and polymer regions, wherein liquid crystal molecules in the liquid crystal regions are axisymmetrically aligned;

said liquid crystal display device further comprising a pair of polarizing plates disposed with polarizing axes thereof respectively according to a longitudinal direction and a latitudinal direction of a screen of the liquid crystal display device.

7. A liquid crystal display device comprising a display medium sandwiched between a plasma generation substrate having channels for generating plasma and a counter substrate, said display medium including liquid crystal regions and polymer regions, wherein liquid crystal molecules in the liquid crystal regions are axisymmetrically aligned;

wherein a wall-like spacer is formed between the plasma generation substrate and the counter substrate so as to cross at least one of walls for partitioning the channels.

8. The liquid crystal display device according to claim 7, further comprising a member made from a polymeric material having a lower softening point than a material for the wall-like spacer between the wall-like spacer and the plasma generation substrate.

9. The liquid crystal display device according to claim 8, wherein the polymeric material is an adhesive agent.

10. A liquid crystal display device comprising a display medium sandwiched between a plasma generation substrate having channels for generating plasma and a counter substrate, the channels being defined by channel walls, said display medium including liquid crystal regions defined by wall-like spacers formed between the plasma generation substrate and the counter substrate, the wall-like spacers being arranged orthogonally to at least one of the channel walls.

11. The liquid crystal display device according to claim 10, wherein the wall-lake spacers are elastic for adhering together the counter substrate and the plasma generation substrate.

* * * * *